Jan. 11, 1938.  N. SINITZIN-WHITE  2,105,103
NAVIGATION INSTRUMENT
Filed Feb. 24, 1936  3 Sheets-Sheet 1
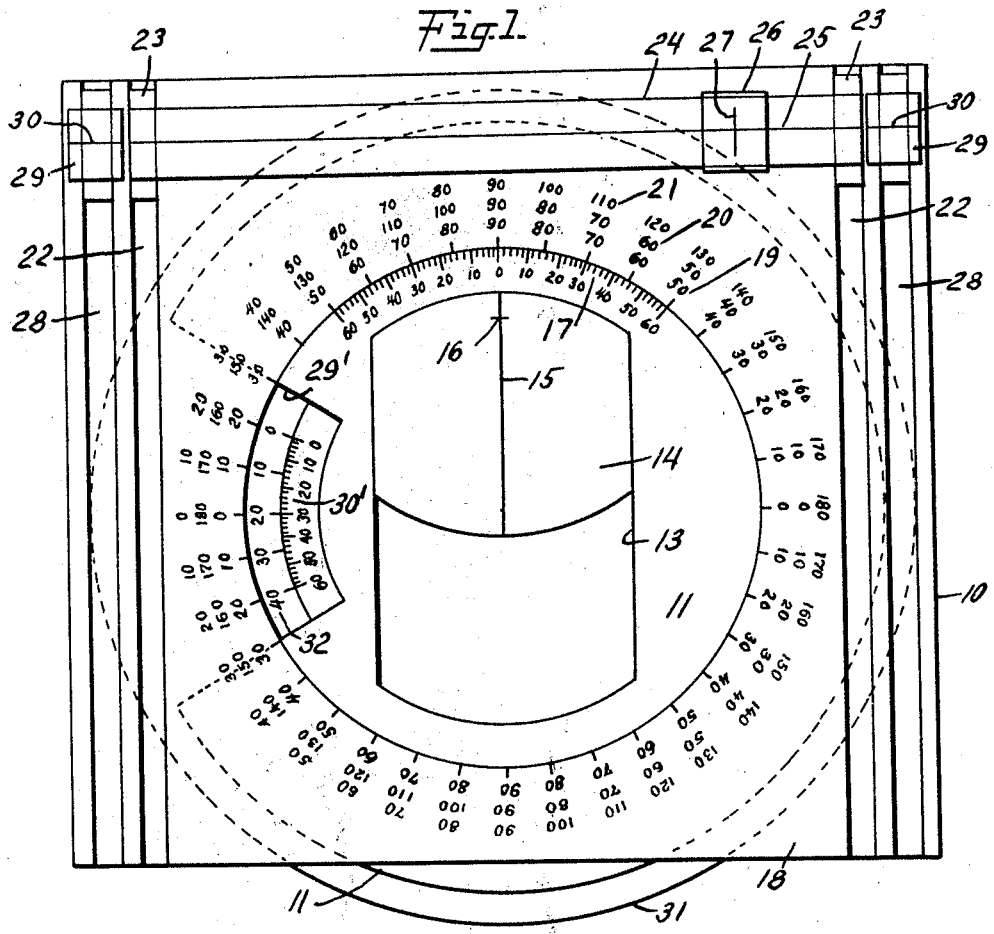
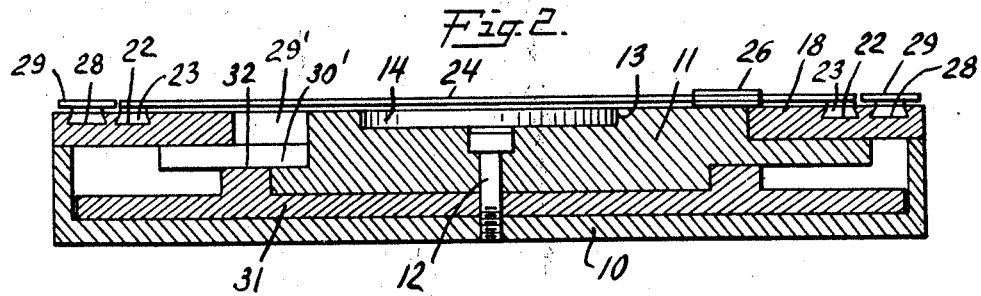
INVENTOR
N. Sinitzin-White
BY
Pennie Davis Marvin & Edmunds
ATTORNEYS Jan. 11, 1938.   N. SINITZIN-WHITE   2,105,103
NAVIGATION INSTRUMENT
Filed Feb. 24, 1936   3 Sheets-Sheet 3

INVENTOR
N. Sinitzin-White
BY
ATTORNEYS

Patented Jan. 11, 1938

2,105,103

UNITED STATES PATENT OFFICE 2,105,103

NAVIGATION INSTRUMENT

Nicholas Sinitzin-White, Westport, Conn., assignor of one-third to John L. R. Glover, Fairfield, Conn., and one-third to Nicholas N. Solovioff, Millford, Conn.

Application February 24, 1936, Serial No. 65,277

10 Claims. (Cl. 33—1)

This invention relates to calculating devices and more particularly to an apparatus for use in celestial navigation for determining the position of a ship, airplane or the like.

In determining a position in the celestial sphere the altitude and azimuth of a celestial body are determined from the known factors which include the hour angle and declination of the celestial body and the dead reckoned latitude of the observer. The first two factors may be obtained from an almanac or similar data and the latter is approximated by applying to the last known position of the ship, the run that has since been made and finding a new dead reckoning position. Having these three factors the two unknowns may be mathematically calculated.

In my copending application Serial No. 12,224, filed March 21, 1935, which has matured into Patent No. 2,080,587 I have disclosed an apparatus wherein the three known values can be placed on three movable members which are so interconnected that the two unknowns are then indicated on two of the members. This device eliminates the necessity of the laborious calculations that would otherwise be necessary and is of much greater simplicity than similar devices that have been proposed for the same purpose in that it consists of but three movable members.

The present invention comprises an improvement over the apparatus shown in my prior application in that a single disc is employed together with a radially movable member and one or more members movable parallel to the horizontal and vertical diameters, respectively, of said disc.

The provision of means whereby values may be projected from a projection of the celestial sphere on a horizontal plane to a projection of the celestial sphere on a vertical plane enables me to solve problems of celestial navigation and similar problems by means of a single rotating disc and a plurality of slides so associated therewith as to permit such projection of values from one plane to the other.

In the accompanying drawings I have shown several embodiments of the invention. In the drawings:

Fig. 1 is a plan view of one form of the invention;

Fig. 2 is a vertical, sectional view thereof;

Figure 6:
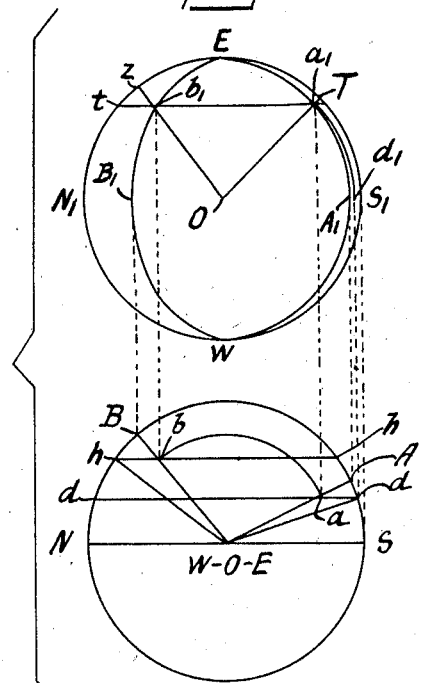
Fig. 6 is a projection of the celestial sphere on a horizontal plane and on a vertical plane.

In order that the principles of the invention may be understood, reference will first be made to Figs. 6 to 8 of the drawings. Referring to Fig. 6 the upper circle represents the projection of a celestial sphere on the horizontal plane. The circle $N_1$, $ES_1$, W is therefore a horizon, point O is the position of the observer and $N_1 S_1$ is his meridian. In the projection of the celestial sphere on the vertical plane shown in the lower view the circle represents the meridian of the observer and the line NS represents the horizon. If the observer is on the pole, the position of the celestial body may be readily determined because in that case the altitude of the body equals its declination. To solve a problem the declination of the body is represented by $d$OS on the lower circle and the hour angle by $TOS_1$ on the upper circle. Line $dd$ therefore represents a circle of declination. If the point $d$ is projected to the horizontal plane in the upper figure, it will be the point $d_1$ on line $N_1 S_1$, the meridian of the observer. If the line $OS_1$ is then rotated till it coincides with the line OT point $d_1$ will then come to point $a_1$. This gives the position of the body on the horizontal projection. A line projected from the point $a_1$ to the vertical projection in the lower view intersects the circle $dd$ at the point $a$ and is the position of the body on the vertical projection of the celestial sphere. If we now imagine that the celestial body is located on the imaginary semicircle which rotates about points E and W, this semicircle is represented by $Ea_1$, $A_1$, W in the horizontal projection and by the straight line $Oa$ A in the vertical projection. To determine the altitude and azimuth if the observer is located at a point other than the pole of the earth the latitude of which is known, this semicircle is rotated through an angle AOB, the complement of the observer's latitude or 90° minus L. Point $a_1$ is then moved to the point $b_1$ on the horizontal projection and the new position of the semicircle is $Eb_1$ $B_1$ W. $BbO$ is the corresponding position in the vertical projection. The azimuth to be determined will then be the angle $N_1OZ$ of the upper part of the figure. A line $hh$ parallel to the horizon NS in the lower figure and passing through the point $b$ intersects the meridian forming an angle $NOh$ which is the altitude to be determined.

Figure 7:
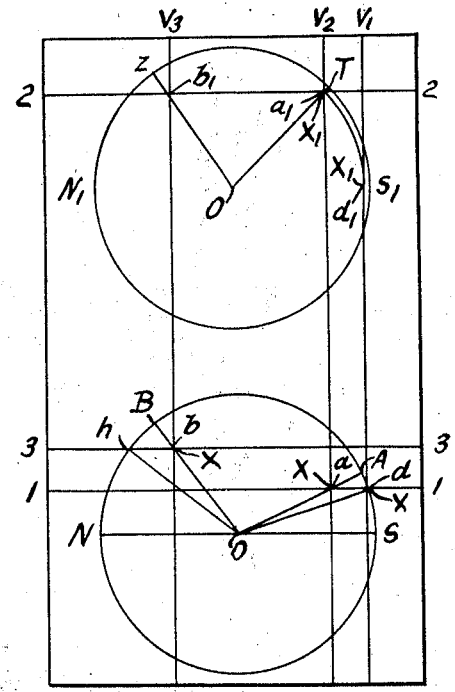
Fig. 7 is a schematic representation of the apparatus of the present invention showing the projection of the celestial sphere on a horizontal plane and the projection of the celestial sphere on a vertical plane on separate discs or circles.

The means whereby problems in celestial navigation may be solved through apparatus consisting of a disc and a plurality of slides will be better understood by reference to Fig. 7 of the drawings in which the upper circle again represents the horizontal projection of the celestial sphere and the lower circle the vertical projection. The lines 1—1, 2—2 and 3—3 and the lines $V_1V_1$, $V_2V_2$, and $V_3V_3$ represent movable lines whereby the various intersections corresponding to the intersections discussed in connection with Fig. 6 may be determined. Likewise the crosses X and $X_1$ represent means which may be moved radially of the two circles. To solve the problem discussed in connection with Fig. 6, the angle $dOS$ equal to the declination of the celestial body is set on the lower circle and the lines 1—1 and $V_1V_1$ are then moved to intersect each other at the point X. The radially movable member of the upper circle is then set at the point where the line $V_1$ intersects the line $N_1S_1$ which corresponds to $d_1$. $OS_1$ of the horizontal projection is then rotated an amount equal to the hour angle to the position OT and $X_1$ then assumes the position $a_1$ which is marked by the horizontal line 2—2 and the vertical line $V_2V_2$. The radius $Od$ and the cross X of the vertical projection is then moved to the point $a$ which is the intersection of the lines 1—1 and $V_2V_2$. Radius $Oa$ of the vertical projection is then moved through the angle AOB equal to 90° minus L to the position OB. The intersection of the lines 3—3 and $V_3V_3$ is then marked by the cross X and where the line 3—3 intersects the meridian or circle determines the angle $NOh$ which is the altitude to be determined. The radius OT is then arranged to pass through the intersection of the lines $V_3V_3$ and 2—2 giving the angle $N_1OZ$ which is the required azimuth.

Figure 8:
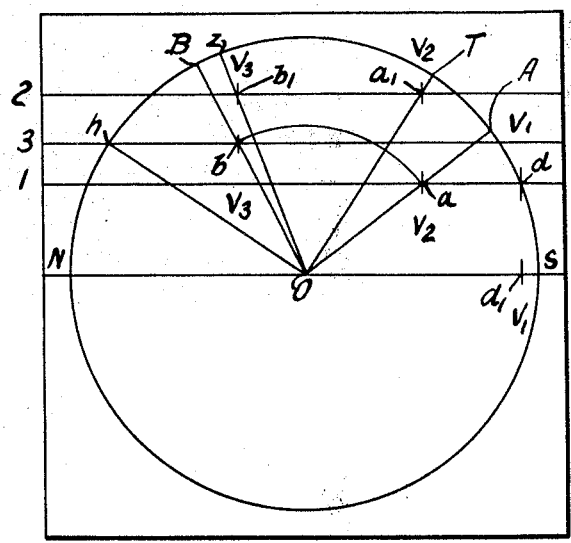
Fig. 8 is a similar view in which the two discs or circles coincide and is therefore a schematic representation of the apparatus shown in Figs. 1 to 5.

In Fig. 8 of the drawings the corresponding positions and intersections are indicated by the same reference characters as in Figs. 6 and 7 but in this figure the two projections of the celestial sphere are projected on a single circle and this view illustrates how the apparatus shown in Figs. 1 and 2 may function with a single rotatable disc and the cooperating slides whereby the positions corresponding to X and $X_1$ and the lines 1—1, 2—2, 3—3, $V_1V_1$, $V_2V_2$, and $V_3V_3$ may be readily obtained. Thus in Fig. 8 after the angle $dOS$ has been set, the point $d_1$ is placed on the horizontal diameter of the circle and its vertical position marked by the line $V_1V_1$. The cross X is moved radially to this point and the radius OS is then moved to the position OT corresponding to the hour angle TOS giving the position $a_1$ which is marked by the lines 2—2 and $V_2V_2$. The position $a$ corresponding to the position of the celestial body in the vertical projection is then determined by the intersection of lines $V_2V_2$ and 1—1. The complement of the latitude of the observer is then added to the angle AOS and the position B marked by the lines 3—3 and $V_3V_3$. The intersection of the line 3—3 with the circle determines the altitude or angle $NOh$. Where the line $V_3V_3$ intersects the line 2—2 determines the azimuth or angle $N_1OZ$.

In the apparatus shown in Figs. 1 and 2 of the drawings the reference numeral 10 designates a casing having a disc 11 arranged therein and rotatably mounted on a pin or support 12. The disc 11 is provided with a slot 13 in its upper face to receive a slide 14. This slide moves radially of the disc and is provided with a radial line 15 and an intersecting hair line 16. The edge of the disc is provided with a vernier 17. A plate 18 surrounds the disc and closes the remainder of the top of the box. This plate is provided with three scales to cooperate with the vernier 17, the inner figures 19 being for the purpose of reading declination and altitude, the intermediate set of figures 20 being for the purpose of reading the hour angle and the outer set of figures 21 being for the purpose of reading the azimuth. The top plate 19 is also provided with two sets of slots at each side. The inner slots 22 are adapted to receive slides 23 which are connected by a transparent member 24 having a horizontal hair line 25 thereon. The member 24 likewise carries a transparent slide 26 having a vertical hair line 27 thereon. The outer slots 28 carry slides 29 having horizontal hair lines 30 thereon.

The disc 11 may be provided with a recess 29' having its edge curved on a radius concentric with the axis of the disc and provided with a vernier 30'. A latitude disc 31 may also be arranged on the axis 12 and provided with a scale 32 with which the vernier 30' cooperates to read the latitude of the observer.

In Figs. 3 to 6 of the drawings I have shown a more simplified form of the invention in which I provide a casing 33 having a disc 34 mounted therein to rotate on an axis 35. This disc is likewise recessed as at 36 to receive a radial slide 37 having a radial line 38 and an intersecting hair line 39. A vernier 45 is arranged on the edge of the disc to cooperate with scales 41 formed on the top 42 of the casing for reading declination and altitude. A transparent slide 43 is arranged over the disc and is provided with a hair line 44. In this form of the invention the disc 34 and the slide 37 are transparent and beneath the disc there is provided a series of curves 45 and 46 for reading hour angle and the azimuth.

In solving a problem with the apparatus shown in Figs. 1 and 2 of the drawings, the same method is followed as outlined in connection with Figs. 6 to 8, particularly Fig. 8. The disc 11 is first turned an amount equal to the declination and this point is marked by moving the slides 24 and the slide 26 over the intersection of the lines 15 and 16. The slide 29 is then moved until the hair line 30 is in alignment with the hair line 25 giving the position of a line $dd$ of Fig. 6. The disc 11 and slide 24 are then moved to the starting position and slide 14 moved down to bring the intersection of lines 15 and 16 to the intersection of lines 25 and 27 corresponding to $d_1$. The disc is then rotated an amount equal to the hour angle and the position $a_1$ marked by moving slides 24 and 26. The other slide 30 is then moved to a position in which its hair line 29 is in alignment with the line 25. Slide 24 is then moved to position 1—1 marked by first slide 30 and disc 11 with slide 14 are set to bring the intersection of lines 15 and 16 to the intersection of lines 25 and 26, thus marking the point corresponding to point "a". Disc 11 is then rotated through an angle corresponding to (90°−L) using for this purpose latitude disc 31 with scale 32 and vernier 30.

The new position of intersection of lines 15 and 16 will correspond to point $b$ on Fig. 8. This point is marked by moving slides 24 and 26 till lines 25 and 27 intersect with lines 15 and 16.

Line 25 will then correspond to line 3—3 on Fig. 8.

To read altitude of the body it is sufficient now to set slide 14 in its initial position and to move disc till lines 15 and 16 will intersect with the line 25. The angle indicated by scale 19 and vernier 17 will be altitude of the body and will correspond to the angle $NOh$ on Fig. 8.

The azimuth can be read on scale 21 by moving slide 24 to position 2—2 indicated by second slide 30 and rotating disc 11 till line 16 will pass through intersection of lines 25 and 27.

The disc 31 is not essential as the positioning of the disc 11 corresponding to the movement of the semicircle in Fig. 6 from the position $Ea_1 A_1 W$ to the position $Eb_1 B_1 W$ may be accomplished by mentally subtracting the latitude of the observer from 90° and moving the disc 11 the resulting distance. On the other hand, the disc 31 may be provided to eliminate the necessity of the mental calculation and permit easier setting of the disc 11 in this operation.

Figure 3:
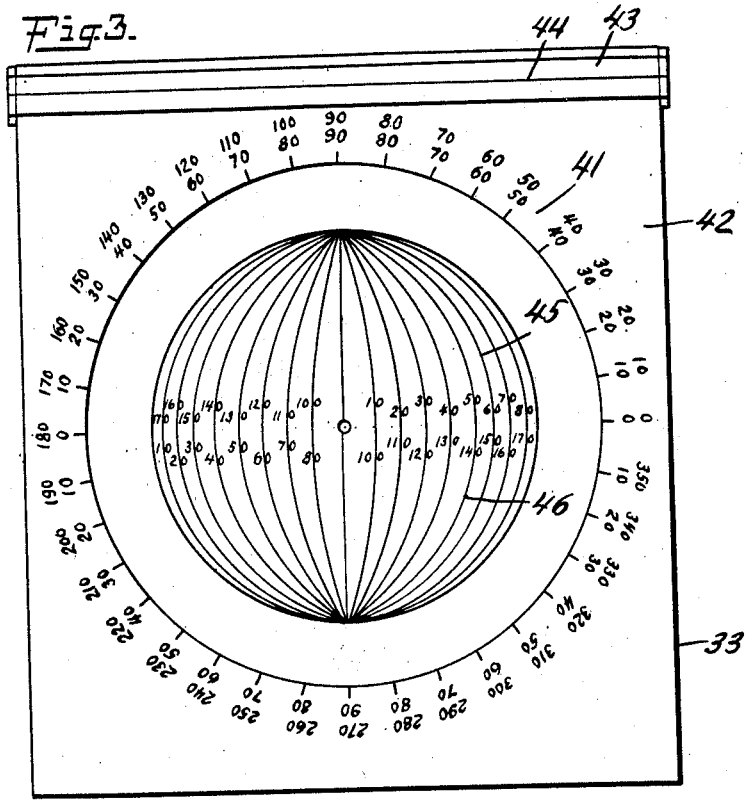
Fig. 3 is a plan view of another form of the invention.
Figure 4:
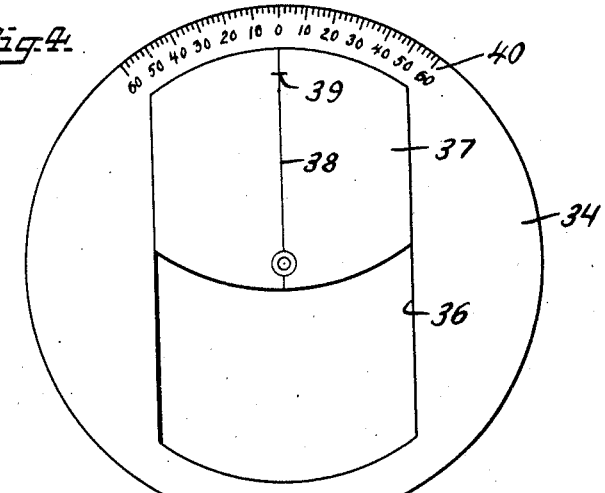
Fig. 4 is a detailed view of the disc employed in Fig. 3.
Figure 5:
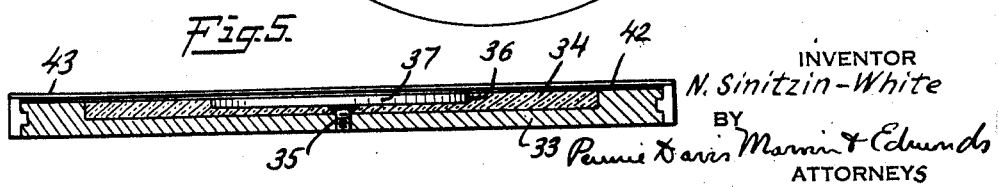
Fig. 5 is a vertical, sectional view of the apparatus shown in Fig. 3.

In the form of the invention shown in Figs. 3 to 5 of the drawings, the operation is essentially the same but the device is of a simpler character and may be constructed cheaper. The hour angle and the azimuth curves 45 and 46 are employed in lieu of the scales 20 and 21 of the form shown in Figs. 1 and 2 of the drawings. These values are read on these curves and it will be apparent that the divisions into multiples of 10° do not permit as accurate calculations with the simplified apparatus of Figs. 3 to 5 as is possible with the apparatus of Figs. 1 and 2.

The surface of the instrument with the curves 45 and 46 may represent one of four projections. When it represents a vertical projection of the sphere with the observer on the pole, the pole is at the top, the horizontal diameter represents the celestial equator and the curves represent meridians. By moving the horizontal slide 43 the hair line can be placed at the position corresponding to the declination angle $doS$ of Fig. 6 thus locating the declination circle. Then by locating a meridian on the curves 45 corresponding to the hour angle of the celestial body, the location of the body on the sphere can be determined. This corresponds to $a$ in Figs. 6 and 7. The rotatable slide 37 is then adjusted to bring the cross formed by lines 38 and 39 on this point. The angle A (Figs. 6 and 7) is then read and the colatitude (90°—L) added to it to set angle B. This brings the cross to position $b$ (Figs. 7 and 8) and the horizontal slide is then moved from its initial position to a position corresponding to the line 3—3 in the lower projection of Fig. 7. In this projection the circle represents the meridian of the observer, the horizontal diameter represents the horizon and the top of the circle represents a zenith. The curves now represent verticals and the horizontal slide in the position 3—3 represents the altitude circle. The altitude angle corresponding to the angle $Noh$ of Figs. 6 and 7 can then be read on the scale. The azimuth of the celestial body will be indicated by a curve passing through the point $b$. During these calculations the circular portion of the instrument containing the curves 45 and 46 represents two vertical projections of the celestial sphere, i. e., with the pole on the top and the curves representing meridians and one with the zenith on the top and the curves representing verticals.

The same circle with the same curves may also represent two other projections. When it represents a projection of the sphere on the celestial equator, the circle is the celestial equator, the pole is in the center, the line 38 on the rotating disc represents the meridian of the celestial body and the hour angle T is measured in degrees and minutes given by the outside disc. The horizontal diameter of the circle represents the meridian of the observer and the curves 45 and 46 represent different positions of an imaginary arc passing through the points of intersection of the celestial equator with the horizon which pass through the top and bottom of the circle corresponding to E and W.

Knowing the auxiliary angle A from the calculations carried out when the device was representing the vertical projection of the celestial sphere with the pole at the top, we can locate a position of the celestial body on the projection of the sphere on the plane of the equator by setting angle TOS, Fig. 7, or TOS, Fig. 8, corresponding to the hour angle and moving the cross radially until it intersects a curve equal to or representing angle A (point $a_1$). Then by rotating the slide and moving the cross along line 2—2 until it intersects a new curve equal to A+(90—L), a new position of the cross is obtained corresponding to $b_1$ of Fig. 7 or Fig. 8. The point of intersection of the cross at this point with the line 2—2 determines the location of the celestial body on the projection of the sphere on the plane of the horizon since the outer circle represents now the horizon, the central point the zenith and the movable hair line 38 the vertical circle. The azimuth is then read at the intersection of this hair line with the outside disc. These latter projections are used in cases where the azimuth can not be read from the curves 45 and 46 with sufficient accuracy. This is the case when the figure is near zero or 180°.

Other changes in the details of construction may be resorted to without departing from the spirit of the invention. The invention broadly comprises means whereby the projection of the celestial sphere on the horizontal plane and the projection of the celestial sphere on the vertical plane may be projected on a flat disc and the values of the unknowns, namely, the altitude and the azimuth of the celestial body thus determined.

I claim:

1. In a device of the character described, a frame, a disc rotatably mounted in the frame, graduations on said frame cooperating with said disc, a slide mounted in said disc and movable radially thereof, a radial line on said slide, a second line intersecting said radial line, members movable longitudinally and transversely of said frame, and lines on said members adapted to intersect and adapted to be arranged over the intersection of said lines on said slide.

2. In a device of the character described, a frame, a disc rotatably mounted in said frame, graduations on said frame cooperating with said disc, a slide mounted on said disc and movable radially thereof, a radial line on said slide, a second line intersecting said radial line at right angles thereto, a member movable on said frame and having a line thereon, and a second member movable on said first member and having a line thereon intersecting the line on said first member at right angles thereto.

3. In a device of the character described, a frame, a disc rotatably mounted on said frame, graduations on said frame cooperating with said disc, a slide mounted on said disc and movable radially thereof, a radial line on said slide, a second line intersecting said radial line at right angles thereto, a member movable on said frame and having a line thereon, and slides movable on said frame parallel to said member and having lines thereon to mark the positions assumed by said member.

4. In a device of the character described, a frame, a rotatable member mounted in said frame, means for measuring rotation of said member, a radial slide carried by said rotatable member, means carried by the slide for indicating positions determined by settings of said member and said slide, and cooperating means carried by the frame for marking said positions.

5. In a device of the character described, a frame, a rotatable member mounted in said frame, graduations on the frame cooperating with the rotatable member to measure the rotation of said member, a radial slide carried by said rotatable member, means carried by the slide for indicating the positions determined by settings of said member and said slide, and cooperating means carried by the frame for marking said positions.

6. In a device of the character described, a frame, a rotatable member mounted in said frame, means for measuring rotation of said member, a radial slide carried by said rotatable member, means carried by the slide for indicating positions determined by settings of said member and said slide, and members slidably mounted on said frame for marking said positions.

7. In a device of the character described, a frame, a rotatable member mounted in said frame, means for measuring rotation of said member, a radial slide carried by said rotatable member, means carried by the slide for indicating positions determined by settings of said member and said slide, and a pair of members movable on said frame at right angles to each other for marking said positions.

8. In a device of the character described, a frame, a rotatable member mounted in said frame, means for measuring the rotation of said member, a radial slide carried by said rotatable member, a radial line on said slide, means for indicating positions on said line determined by settings of said member and said slide, and cooperating means carried by said frame for marking said positions.

9. In a device of the character described, a frame, a rotatable member mounted in said frame, means for measuring rotation of said member, a radial slide carried by said rotatable member, means carried by the slide for indicating positions determined by the setting of said member and said slide, and a series of curves on said frame beneath the member and cooperating with the slide for marking said positions.

10. In a device of the character described, a frame, a rotatable member mounted on said frame, graduations on said frame cooperating with said member for measuring rotation of the member, a radial slide carried by said rotatable member, means carried by the slide for indicating positions determined by the setting of said member and said slide, and a series of curves on said frame beneath the member and cooperating with the slide for marking said positions.

NICHOLAS SINITZIN-WHITE.